(12) United States Patent
Kronz

(10) Patent No.: US 6,941,374 B1
(45) Date of Patent: Sep. 6, 2005

(54) HIDDEN AGENT TRANSFER PROTOCOL

(75) Inventor: Jason A. Kronz, Lawrenceville, GA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/369,114

(22) Filed: Aug. 5, 1999

(51) Int. Cl.$^7$ .................................................. G06F 15/16
(52) U.S. Cl. ...................................... 709/229; 709/227
(58) Field of Search ............................... 709/228, 249, 709/202, 203, 227, 246, 201, 217–219

(56) References Cited

U.S. PATENT DOCUMENTS

| | | | |
|---|---|---|---|
| 5,329,619 A | * 7/1994 | Page et al. ................... 395/200 |
| 5,546,583 A | 8/1996 | Shriver |
| 5,732,219 A | 3/1998 | Blumer et al. |
| 5,758,083 A | * 5/1998 | Singh et al. ............ 395/200.53 |
| 5,758,088 A | * 5/1998 | Bezaire et al. ......... 395/200.62 |
| 5,793,966 A | 8/1998 | Amstein et al. ........ 395/200.33 |
| 5,898,835 A | 4/1999 | Truong |
| 5,933,849 A | * 8/1999 | Srbljic et al. ................ 711/118 |
| 5,961,590 A | * 10/1999 | Mendez et al. ............. 709/206 |
| 6,154,738 A | * 11/2000 | Call ................................ 707/4 |
| 6,154,768 A | 11/2000 | Chen et al. |
| 6,157,618 A | * 12/2000 | Boss et al. ................... 370/252 |
| 6,202,094 B1 | 3/2001 | Grosser, Jr. et al. |
| 6,338,089 B1 | 1/2002 | Quinlan |
| 6,347,339 B1 | 2/2002 | Morris et al. |
| 6,351,771 B1 | * 2/2002 | Craddock et al. ............ 709/227 |
| 6,359,892 B1 | * 3/2002 | Szlam ......................... 370/401 |
| 6,412,007 B1 | * 6/2002 | Bui et al. .................... 709/227 |
| 6,430,409 B1 | * 8/2002 | Rossmann .................... 455/422 |
| 6,446,108 B1 | * 9/2002 | Rosenberg et al. ......... 709/203 |
| 6,446,109 B2 | * 9/2002 | Gupta .......................... 709/203 |
| 6,523,696 B1 | * 2/2003 | Saito et al. .................. 709/223 |
| 6,658,463 B1 | * 12/2003 | Dillon et al. ................ 709/219 |
| 6,675,196 B1 | * 1/2004 | Kronz ......................... 709/203 |
| 6,742,022 B1 | 5/2004 | King et al. .................. 709/219 |
| 6,799,195 B1 | 9/2004 | Thibault et al. ............. 709/203 |
| 6,832,116 B1 | 12/2004 | Tillgren et al. ................. 700/1 |

FOREIGN PATENT DOCUMENTS

EP       -1 003 114 A1 *   5/2000   ........... G06F/17/60

OTHER PUBLICATIONS

U.S. Appl. No. 09/369,118, filed Aug. 5, 1999, Kronz.

* cited by examiner

*Primary Examiner*—Glenton B. Burgess
*Assistant Examiner*—Kimberly Flynn
(74) *Attorney, Agent, or Firm*—Seed IP Law Group PLLC

(57) ABSTRACT

A method for a first device to access the services supplied by a second device by establishing a communicative connection between the first consumer device and a first server. The first server, establishes a communicative connection between the first server and a second server. The second server establishes a communicative connection between the second server and the second device. Once the communicative connection are established, a service request can be sent from the first device, to the second device utilizing the communicative connections. In response to receiving the request the second consumer device can perform the requested service.

72 Claims, 4 Drawing Sheets

HIDDEN AGENT TRANSFER PROTOCOL

RELATED APPLICATIONS

This application is related to U.S. application Ser. No. 09/369,118, entitled "Universal Protocol for Enabling a Device to Discover and Utilize the Services of Another Device," filed on Aug. 5, 1999.

BACKGROUND

Data transfer protocols are used to facilitate communication between electronic devices by providing a common set of rules by which data may be exchanged between one device and another. A universal protocol could theoretically allow one device to communicate with any other device, from simple devices like the lights in a room to complex devices like personal computers. However, to approach such an ideal, the protocol itself has to be usable with at least a significant proportion of the devices. Different types of devices have different characteristics such as microprocessor abilities, free memory, and accompanying costs. In addition, consumer devices are produced by a wide variety of manufacturers. Coordination and cooperation in interfacing a wide variety of electronic devices is very difficult.

Many times in the past, manufacturers have made attempts to allow consumer level devices to be able to communicate meaningful data or commands to one another. Many protocols define data links between standard small devices. However, this also meant that usually the "standard" became only a standard for that genre of device. Further, while these protocols provide a data link, they do not provide a standard method to allow simple relevant information transfer between two small devices. For example, a typical pager cannot send control information to any particular cellular telephone requesting the cellular telephone to initiate a call to a certain number; a "caller-ID" box is not able to instruct a PDA to display all the contact information for the person who is calling; and a PDA cannot print or fax (without a modem or special drivers).

The Inventor of the present invention has developed a protocol and method to facilitate communication between various electronic devices and the sharing of features, functionality and information between these devices which has been described in the invention, U.S. application Ser. No. 09/369,118, entitled "Universal Protocol for Enabling a Device to Discover and Utilize the Services of Another Device," the entirety of which is incorporated herein by reference. This universal protocol is known as the Service Discovery Transport Protocol ("SDTP").

For background information helpful in understanding the present invention, a description of SDTP follows. SDTP is a protocol for facilitating communication between various electronic devices and the sharing of features, functionality and information between these devices. In general, SDTP is a protocol by which one device (the "client device") can discover what services are offered by another device (the "server device"). Utilizing this protocol, the client device can take advantage of the services of the server device. Advantageously, the SDTP is simple enough to be used by nearly any type of electronic device, but at the same time it is robust enough to allow a user to author high-level applications utilizing multiple different services available from multiple devices without requiring the user to have any knowledge of any particular device interface or how the device works. SDTP is capable of use by a wide range of consumer devices allowing them to interact by standardizing many of the normal tasks associated with these devices. SDTP provides a simple data link between these devices.

The operation of SDTP actually begins when the server device sends a message to the client device to inform the client device that it is capable of communicating using the protocol. This message and all subsequent messages may be sent using standard 8-bit ASCII characters. Once the client device determines that the server device is capable of communicating using the protocol, the client device may request the server device to identify what kinds of services the server provides. This request is performed by transmitting a type-command to the server device.

Upon receiving the type-command, the server device responds by transmitting one or more device/service identifiers back to the client device. Each device/service identifier is unique, and represents either a specific device type identification ("ID"), such as a thermostat, a door, a pager, a PDA or many others, or a specific service type identification ("SD"), such as the ability to raise the temperature of the thermostat or to transmit the messages stored in the pager. Finally, the server device transmits a standard ASCII sequence to signal the last of the device/service identifiers.

After the server device identifies itself as being capable of using the protocol, the client device may issue commands to the server device using the unique service identifiers just described. Any necessary parameters may be passed along as well. If everything operates correctly, the service identified by the command is then provided by the server device. Finally, the server device responds to each such command by sending a status code back to the client device. The status code denotes that either: (a) the requested service was unavailable; (b) the server device was unable to complete the operation; (c) the command contained a syntax error; or (d) that the operation completed successfully.

SDTP also supports "learning" new services with which the client is not previously familiar. To invoke this capability, the client device transmits a use-command to the server device to identify the service that the client wishes to learn. Upon receiving the use-command, the server device transmits a service identifier corresponding to the new service and any available parameters. The client device may then invoke the service by sending the service identifier and the requisite parameters.

As the above description of the applicant's SDTP invention shows, attempts have been made in the past to allow various consumer level devices to communicate with one another across a room or perhaps even from room to room within a house; however, there has not been available a method for facilitating communication between consumer devices situated in different locations. For example, there is no protocol for enabling a consumer device at one's home to communicate with a consumer device at one's office. By the same token, there is no protocol for enabling a person's consumer device in a building's conference room facility to communicate with a consumer device in that person's office within the same building.

Therefore, a method is needed to facilitate communications between consumer devices where the consumer devices are located remotely from each other.

SUMMARY

The present invention is directed towards a system, a protocol and a method for one or more consumer devices at a first location to access the services supplied by one or more consumer devices at a second location. In general, a consumer device at the first location must establish a connection with the a first server at the first location. Next, the first server must establish a network connection with a second server at the second location. Then, the second server at the second location must establish a connection with one of the consumer devices at the second location. In this way, a communications link is formed from a consumer device at a first location to a consumer device at a second location. Next, the consumer device at the first location requests a service to be performed by the consumer device at a second location where the consumer device at the first location communicates with the consumer device at the second location across the established communications link. Lastly, the consumer device at the second location performs the requested service on behalf of the request by the consumer device at the first location.

Therefore, it can be seen that the present invention facilitates communication between remotely located consumer devices by extending the functionality of the Service Discovery Transfer Protocol. These and other aspects, features, and advantages of the present invention will be set forth in the description that follows and possible embodiments thereof, and by reference to the appended drawings and claims.

DETAILED DESCRIPTION

Figure 1:
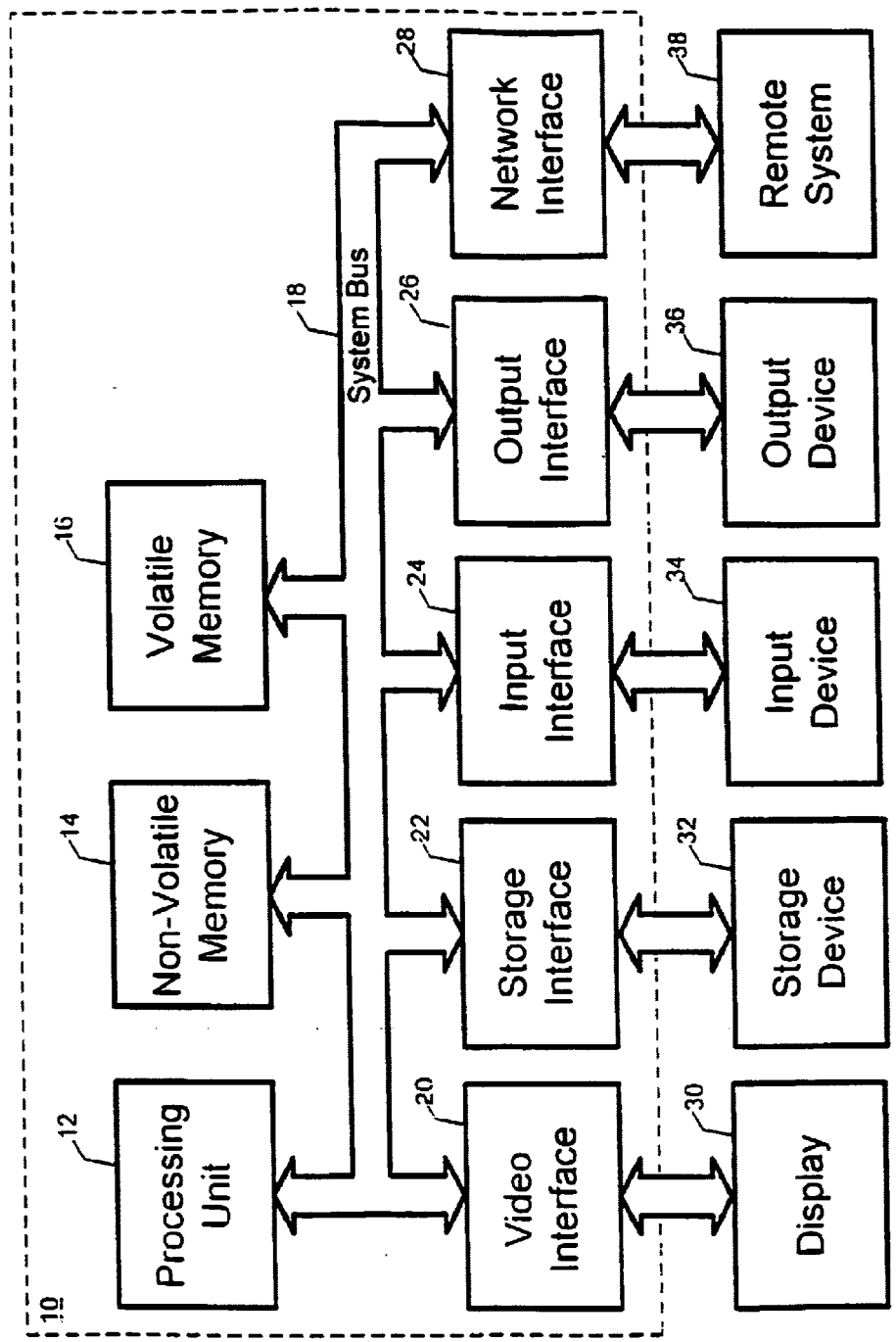
FIG. 1 is a system diagram that illustrates an exemplary environment suitable for implementing various embodiments of the present invention.

Before describing the details of the current invention, some terminology used herein is described. As used in the specification and claims of this invention, consumer devices include, but are not limited to: desktop computers, personal digital assistants (pda's), laptop computers, handheld computers, notebook computers, embedded processor devices, printers, fax machines, scanners, remote control units, X-10™ type electrical control devices, thermostats, electrical outlets, light switches, window controls, garage door systems, whole-house control systems, HVAC systems, security systems and devices, overhead projectors, slide projectors, movie projectors, video cassette recorders and players, compact disk players, DVD players, televisions, stereo systems and components including speakers, clocks, cellular and portable telephones, pagers (one-way and two-way), weather stations, and timekeeping systems. Those skilled in the art will realize that other consumer related devices may also take advantage of this invention and are included within the definition of consumer devices.

The term "protocol" generally refers to a set of formal rules or conventions describing how data is treated in an electronic system. In electronic communications, protocols define the electrical and physical standards to be observed, such as bit-ordering and byte-ordering and the transmission and error detection and correction of the bit messages, the client-server dialog, character sets, and sequencing of messages. Link protocols define the basics of how communication is established and maintained between two devices. Data protocols define how meaningful data is exchanged between the two devices using the link protocol as the underlying communication layer. Unless otherwise indicated, the term "protocol," as used below, refers to the data protocol employed by a given connection between two devices to communicate meaningful data, such as the discovery of information about one device and the issuance of commands by one device to the other.

Referring now to the drawings, in which like numerals represent like elements throughout the several figures, aspects of the present invention and exemplary operating environments and embodiments will be described.

FIG. 1 is a system diagram that illustrates an exemplary environment suitable for implementing various embodiments of the present invention. FIG. 1 and the following discussion provide a general overview of a platform onto which the invention may be integrated or implemented. Although in the context of the exemplary environment the invention will be described as consisting of instructions within a software program being executed by a processing unit, those skilled in the art will understand that portions of the invention, or the entire invention itself, may also be implemented by using hardware components, state machines, or a combination of any of these techniques. In addition, a software program implementing an embodiment of the invention may run as a stand-alone program or as a software module, routine, or function call, operating in conjunction with an operating system, another program, system call, interrupt routine, library routine, or the like. The term program module will be used to refer to software programs, routines, functions, macros, data, data structures, or any set of machine readable instructions or object code, or software instructions that can be compiled into such, and executed by a processing unit.

Those skilled in the art will appreciate that the system illustrated in FIG. 1 may take on many forms and may be directed towards performing a variety of functions within a range of consumer devices, any of which may serve as an exemplary environment for embodiments of the present invention. The invention may also be practiced in a distributed computing environment where tasks are performed by remote processing devices that are linked through a communications network. In a distributed computing environment, program modules may be located in both local and remote memory storage devices.

The exemplary system illustrated in FIG. 1 includes a computing device 10 that is made up of various components including, but not limited to, a processing unit 12, non-volatile memory 14, volatile memory 16, and a system bus 18 that couples the non-volatile memory 14 and volatile memory 16 to the processing unit 12. The non-volatile memory 14 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), and battery backed random access memory (RAM). The non-volatile memory 14 provides storage for power on and reset routines (bootstrap routines) that are invoked upon applying power or resetting the computing device 10. In some configurations the non-volatile memory 14 provides the basic input/output system (BIOS) routines that are utilized to perform the transfer of information between the various components of the computing device 10.

The volatile memory 16 may include a variety of memory types and devices including, but not limited to, random access memory (RAM), dynamic random access memory (DRAM), FLASH memory, EEROM, bubble memory, registers, or the like. The volatile memory 16 provides temporary storage for program modules or data that are being or may be executed by, or are being accessed or modified by the processing unit 12. In general, the distinction between non-volatile memory 14 and volatile memory 16 is that when power is removed from the computing device 10 and then reapplied, the contents of the non-volatile memory 14 is not lost, whereas the contents of the volatile memory 16 is lost, corrupted, or erased.

The computing device 10 may access one or more internal or external display devices 30 such as a CRT monitor, LCD panel, LED panel, electroluminescent panel, or other display device, for the purpose of providing information or computing results to a user. The processing unit 12 interfaces to each display device 30 through a video interface 20 coupled to the processing unit over system bus 18.

The computing device 10 may have access to one or more external storage devices 32 such as a hard disk drive, a magnetic disk drive for the purpose of reading from or writing to a removable disk, and an optical disk drive for the purpose of reading a CD-ROM disk or to read from or write to other optical media, as well as devices for reading from and or writing to other media types including but not limited to, FLASH memory cards, Bernoulli drives, magnetic cassettes, magnetic tapes, or the like. The processing unit 12 interfaces to each storage device 32 through a storage interface 22 coupled to the processing unit 12 over system bus 18. The storage devices 32 provide non-volatile storage for the computing device 10.

The computing device 10 may receive input or commands from one or more input devices 34 such as a keyboard, pointing device, mouse, modem, RF or infrared receiver, microphone, joystick, track ball, light pen, game pad, scanner, camera, or the like. The processing unit 12 interfaces to each input device 34 through an input interface 24 coupled to the processing unit 12 over system bus 18. The input interface may include one or more of a variety of interfaces, including but not limited to, an RS-232 serial port interface or other serial port interface, a parallel port interface, a universal serial bus (USB), an optical interface such as infrared or IrDA, an RF or wireless interface such as Bluetooth, or other interface.

The computing device 10 may send output information, in addition to the display 30, to one or more output devices 36 such as a speaker, modem, printer, plotter, facsimile machine, RF or infrared transmitter, or any other of a variety of devices that can be controlled by the computing device 10. The processing unit 12 interfaces to each output device 36 through an output interface 26 coupled to the processing unit 12 over system bus 18. The output interface may include one or more of a variety of interfaces, including but not limited to, an RS-232 serial port interface or other serial port interface, a parallel port interface, a universal serial bus (USB), an optical interface such as infrared or IrDA, an RF or wireless interface such as Bluetooth, or other interface.

The computing device 10 may operate in a networked environment using logical connections to one or more remote systems, such as a remote computer 38. The remote computer 38 may be a server, a router, a peer device or other common network node, and typically includes many or all of the components described relative to the computing device 10. When used in a networking environment, the computing device 10 is connected to the remote system 38 over a network interface 28. The connection between the remote computer 38 and the network interface 28 depicted in FIG. 1 may include a local area network (LAN), a wide area network (WAN), a telephone connection, or the like. These types of networking environments are commonplace in offices, enterprise-wide computer networks, intranets and the Internet.

It will be appreciated that program modules implementing various embodiments of the present invention may be stored in the storage device 32, the non-volatile memory 14, the volatile memory 16, or in a networked environment, in a remote memory storage device of the remote system 38. The program modules may include an operating system, application programs, other program modules, and program data. The processing unit 12 may access various portions of the program modules in response to the various instructions contained therein, as well as under the direction of events occurring or being received over the input interface 24 and the network interface 28.

Figure 2:
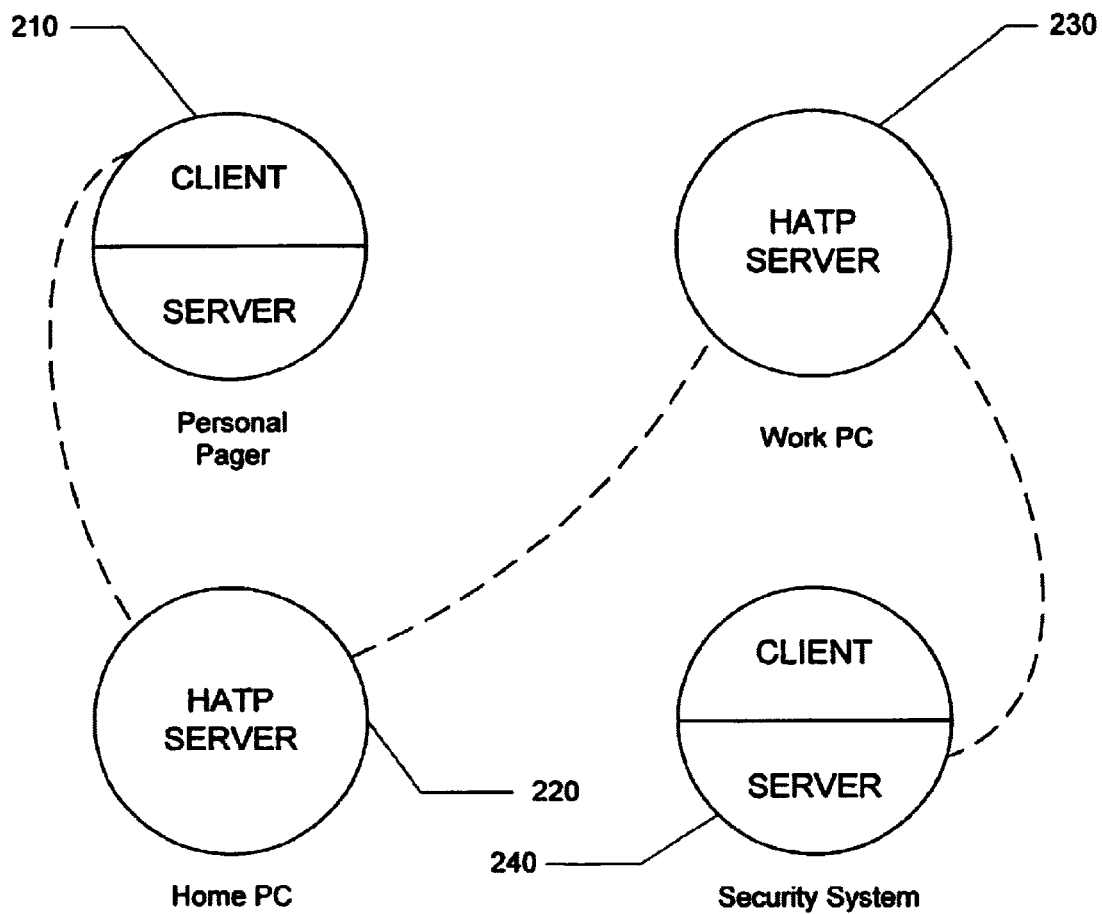
FIG. 2 illustrates an exemplary environment in which an exemplary embodiment of the HATP protocol operates.

FIG. 2 illustrates an exemplary environment in which an exemplary embodiment of the HATP protocol operates. As shown, the environment comprises a plurality of devices 210 & 240, represented by circles. As used herein, "devices" include server devices, client devices, client/server devices 210 & 240. In addition, gateway servers or Hidden Agent Transfer Protocol ("HATP") servers 220–230 are shown. The server devices are capable of providing one or more services or carrying out one or more functions. The client devices are capable of instructing the server devices to carry out a designated function or service via a communications link represented. A service could be an external operation, such as adjusting the temperature of a thermostat or switching the lights in a room on or off, or it might involve additional communication between the server device and the client device, such as sending a telephone number from a PDA to a laptop computer.

As illustrated in FIG. 2, a particular device may be both a server device and a client device such as client/server devices 210 & 240. The client/server devices 210 & 240 may be capable of instructing other server devices to carry out a designated function while, at the same time, may carry out a function itself. For example, in its client role, a laptop computer might need to retrieve data from a PDA carried by a user, and then in its server role, the laptop might be called on by the user to provide a telephone number directly to a cellular telephone. Thus, the laptop functions as both a client device and a server device. However, in the following description, each device will be discussed only in its role as either a client device or a server device.

As illustrated in FIG. 2, gateway servers or HATP servers 220–230 interface to other HATP servers, client devices, server devices, and client/server devices. HATP facilitates an access point for devices to link across a network (internet/intranets), such that devices remotely scattered across a building, across a city, or across the world appear to each other to be in the same room communicating over the link layer. HATP servers 220–230 act as both clients and servers to other devices. For those local devices wishing to access services from a remote device at a remote location, the HATP server proximate the local device appears to the local device as an SDTP server; whereas, the HATP server proximate the remote device appears to the remote device as an SDTP client. In the exemplary embodiment shown in FIG. 2, a two-way personal pager device 210 requests a first HATP server 220 to connect to a second HATP server 230 in order to use the services available from a security system device 240. In this instance, the first HATP server 220 acts like an SDTP server device to the personal pager device 210, and the second HATP server 230 appears to security system device 240 to be an SDTP client device.

HATP servers thus act as a gateway between remotely located SDTP devices. The HATP server implements two different protocols: when interfacing to SDTP devices, HATP servers utilize a HATP extension to the standard SDTP protocol described in the co-filed U.S. application Ser. No. 09/369,118, entitled, "Universal Protocol for Enabling a Device to Discover and Utilize the Services of Another Device;" and when interfacing to another HATP server, the HATP server utilizes the HATP protocol. Both the HATP extension to the SDTP protocol, and the HATP protocol are described in this specification.

A HATP server 220–230 typically resides on a personal computer and communicates with SDTP devices over the standard link layer. The HATP servers 220–230 communicate with each other over the Internet or over an intranet using TCP/IP protocol, also known as the network link. Of course, those skilled in the art will realize that other network protocols could be used to link one or more HATP servers 220–230 to each other.

As stated above, when connected to a device, a HATP server "looks" like a standard SDTP device implementation. When a device connects to a HATP server, it will export services like an SDTP server. At least one service will be the HATP service. The HATP server has the following services available which serve as an extension of the SDTP protocol. Table 1 below outlines these services and their associated parameters.

TABLE 1

| Device | Device ID | Service | Service ID | Parameters |
|---|---|---|---|---|
| HATP Server | XYZ-HATP | | | |
| | | Connect to another HATP server | XYZ-CONNECT | <network address> <userid> <password> |
| | | Disconnect | XYZ-DISCONNECT | |

The local HATP server will reply to the local SDTP device with one of the following responses from Table 2:

TABLE 2

| Device | Device ID | Service ID | Response | Comments |
|---|---|---|---|---|
| HATP Server | XYZ-HATP | | | |
| | | XYZ-CONNECT | XYZ-NOSERV | A connection to the server could not be established. |
| | | | XYZ-NOUSER | The user/password combination is not authentic. |
| | | | XYZ-OK | The connection is established. |
| | | | XYZ-ALREADY | A connection is already established with another server. |
| | | XYZ-DISCONNECT | XYZ-DISCONNECT | |

The HATP protocol comprises at least three HATP commands that may be issued between HATP servers once a network link connection is established. One such command is the XYZ-USER command whereby the local HATP server requests the remote HATP server to verify that a user identification sent by the local SDTP device is valid. Another command is the XYZ-PWD command by which the local HATP server verifies from the remote HATP server that the password sent by the local SDTP device is valid for that user identification. Another command is the XYZ-TYPE command which requests the remote HATP server to return a list of-ID's and SD's of SDTP devices with which the remote HATP server is in communication. Table 3 below illustrates these HATP commands and parameters.

TABLE 3

| Device | Device ID | Service | Service ID | Parameters |
|---|---|---|---|---|
| HATP Server | XYZ-HATP | | | |
| | | Transfer the User ID | XYZ-USER | <userid> |
| | | Transfer the password | XYZ-PASSWORD | <password> |
| | | Get a list of IDs and services | XYZ-TYPE | |

The responses sent by the remote HATP server from requests by the local server are listed in Table 4 below.

TABLE 4

| Device | Device ID | Service ID | RESPONSE | COMMENTS |
|---|---|---|---|---|
| HATP Server | XYZ-HATP | XYZ-USER | XYZ-OK | <userid> is in the database of users |
| | | | XYZ-NOUSER | <userid> is not in the database of users |
| | | XYZ-PASSWORD | XYZ-OK | <password> is valid for that <userid> |
| | | | XYZ-INVLDPW | <password> is invalid for that <userid> |
| | | XYZ-TYPE | | Returns a list of ID's and SD's in communication with the remote HATP server. |

Figure 3:
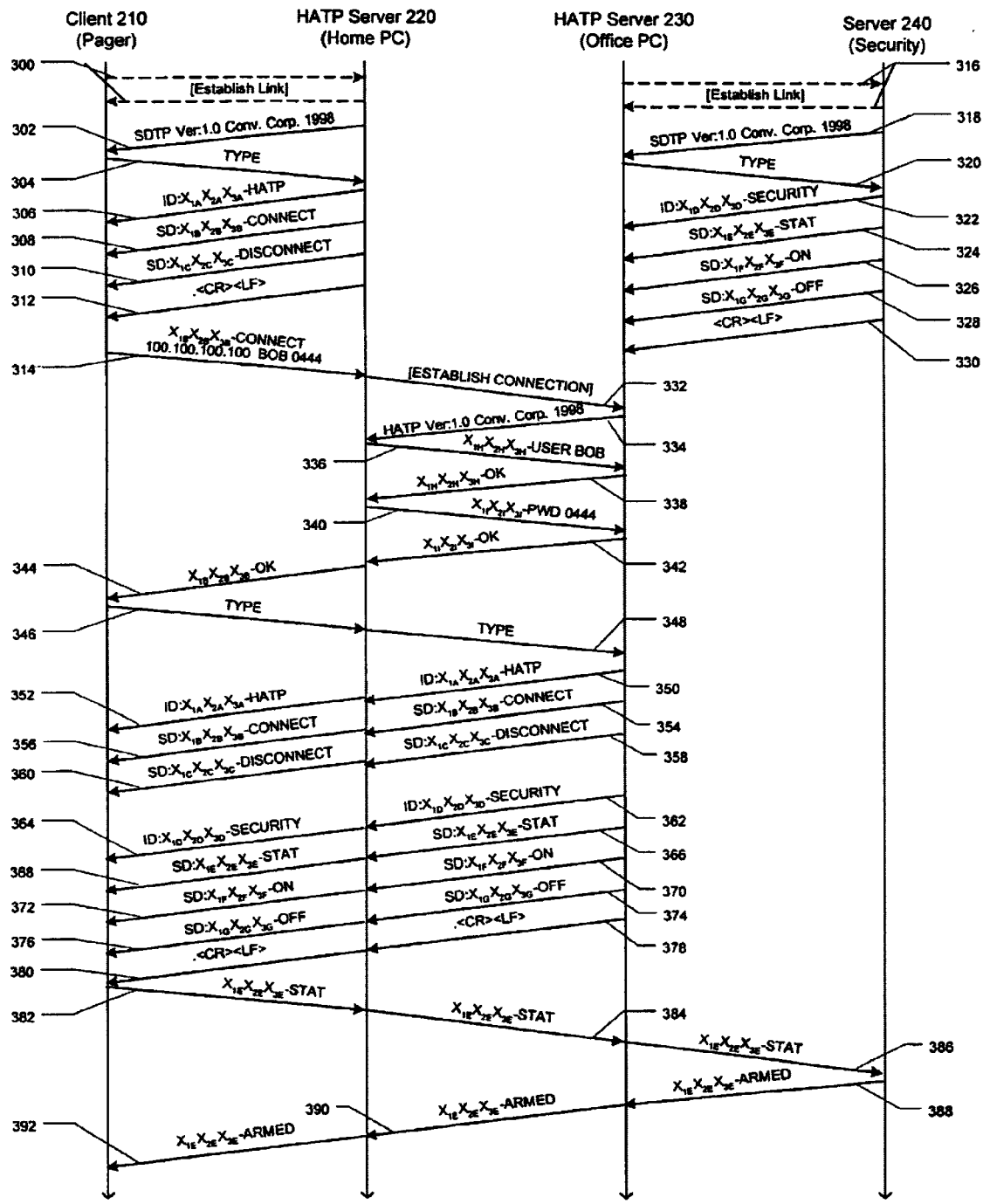
FIG. 3 is an exemplary sequential diagram showing the basic steps of an exemplary embodiment of the present invention.

FIG. 3 is an exemplary sequential diagram illustrating the basic steps of an exemplary embodiment of the present invention. It is important to note that this diagram is meant to depict only the basic functionality of the protocol and that actual use of the protocol will commonly involve a greater or lesser number of steps. Further, it is important to note that the steps shown and described do not all have to take place in the sequence shown. The sequence represents only a typical use of the available protocol functions which may or may not be followed in actual use.

As shown in FIG. 3, use of the protocol of the present invention does not begin until communication between a client 210 and a HATP server 220 is already established at Step 300 using a link protocol, also referred to as a link layer. The protocol of the present invention does not require the use of a specific link layer, but in an exemplary embodiment, the protocol may impose certain requirements such as: 1) allowing for serial ASCII data transfer; and 2) if binary data is to be sent, using standard UUEncode/UUDecode routines to provide the proper conversions to and from ASCII data. Existing link layers which meet these requirements include, but are not limited to, serial cable, IrDA, Bluetooth and TCP/IP sockets.

If a device provides a service, it must be running a protocol server. Once a connection 300 using the link layer is complete, the HATP server 220 will identify itself as being capable of communicating using the protocol of the present invention by issuing a tag line message 302. The issuance of the tag line message 302 signals the actual start of the operation of the protocol of the present invention. In an exemplary embodiment, the tag line message 302 and all subsequent messages are sent using standard 8-bit ASCII characters. In the illustrated embodiment, the tag line message 302 is in the following format:

PROTOCOLNAME VER:N.N [COMMENTS].

where PROTOCOLNAME is the name of the protocol, N.N is the current version of that protocol, and COMMENTS is an optional field which can be used to describe the manufacturer, the date of manufacture, or the like. As previously mentioned in referenced U.S. application, Ser. No 09/369,118 Convergence Corporation has developed a universal protocol, called Service Discovery Transport Protocol ("SDTP") which embodies many of the aspects of this invention. Thus, in the example shown in FIG. 3, the SDTP-enabled server transmits the following tag line message:

SDTP VER: 1.0 Conv. Corp. 1998.

Further description of the protocol of the present invention will focus on this specific, exemplary embodiment, but it should be understood that the present invention is not limited to the specifics of the SDTP protocol.

Once the HATP server 220 issues the tag line message 302, the client 210 may request the HATP server 220 to identify the device types it supports and the services the HATP server 220 provides. This request is performed by transmitting a type-command 304 to the HATP server 220. The type-command could be implemented in a variety of forms, but in the illustrated embodiment, the type-command 304 comprises the word "TYPE." Although it is common for the client to send the type-command 304, it should be understood that sending the type-command is not a required step. For example, a client may already be aware that a particular service is available from the server. Advantageously, this may save time in the communication process.

If the HATP server 220 receives the type-command 304, the HATP server 220 transmits to the client 210 a data packet 306–312 describing the devices and services provided by the HATP server 220. The data packet 306–312 contains several data fields. Among the data fields are one or more device/service identifiers 306–310, each of which represents either a specific device type or a specific service type. For example a device type may include a thermostat, a door, a pager, a PDA or the like. A service type may include the ability to raise the temperature of a thermostat or to transmit the messages stored in a pager. In the preferred embodiment illustrated in FIG. 2 & FIG. 3, the device is a HATP server where the device/service identifier subsists in the following form:

$x_1x_2x_3$-NAME where NAME may be a short (7 characters or less) description of the device or the service, and $x_1x_2x_3$ is a unique three character "identifier." Each of the three characters of the three character identifier is chosen from an alphabet consisting of the characters:

[0 . . . 9], [a . . . z], and [A . . . Z].

In addition, the $x_1$, $x_2$ and $x_3$ characters are chosen such that $(x_1.x_2)+x_3$ forms a unique value. This technique allows for 12161 unique device/services to be used under SDTP and HATP while at the same time only requiring 16-bit math to be used when describing a device or a service. Thus, the data packet 306–312 sent by the server device must include at least one device identifier 306. In the example shown in FIG. 3, the device identifier is $X_{1A}X_{2A}X_{3A}$-HATP. In addition, because HATP servers support a variety of services, the device identifier 306 is followed by multiple service identifiers 308–310. In the example shown in FIG. 3, the service identifiers are $X_{1B}X_{2B}X_{3B}$-CONNECT 308 and $X_{1C}X_{2C}X_{3C}$-DISCONNECT 310.

In an exemplary embodiment, each individual device/service identifier 306–310 is sent as a single line of data and is limited to a maximum of 64 characters in length. Advantageously, this technique allows devices having a limited amount of RAM to receive and process a full line of data without facing an overflow condition. The end of a line of data is signaled by transmitting the ASCII carriage return and line feed characters. Upon transmission of the final device/service identifier 306–310 by the HATP server, the end of the response is signaled by transmitting an end of response message 312. In an exemplary embodiment, an end of response message 312 includes the ASCII characters .<CR><LF>. Thus, the basic structure of a HATP server data packet sent in response to a type-command would be as follows:

ID: $X_{1A}X_{2A}X_{3A}$-HATP<cr><lf>

SD: $X_{1B}X_{2B}X_{3B}$-CONNECT<cr><lf>

SD: $X_{1C}X_{2C}X_{3C}$-DISCONNECT<cr><lf>.<cr><lf>

Once the HATP server 220 has established a link with the client 210, in the exemplary embodiment a pager, the pager may issue commands to the HATP server 220. The CONNECT service request 314 is sent from the client 210 to the HATP server followed by the required parameters. The purpose of the CONNECT service is to request the local HATP server 220 to connect to a remote HATP server 230; therefore, the parameters required for the CONNECT service include the network address of the remote HATP server 230 to which the client 210 wishes to become connected, the user ID of the client 210, and the password of the client 210. The CONNECT request 314 consists of the CONNECT command followed by IP address 100.100.100.100, user identification "BOB", and password "0444."

Once the HATP server 220 receives the client's CONNECT request 314, the HATP server 220 uses the appropriate protocol, TCP/IP or another protocol, to form a network link connection 332 with the remote HATP server 230. When the network link connection 332 is established between the two HATP servers 220 and 230, the HATP server 230 at the remote location, shown as an office PC, sends forth to the HATP server 210 at home a tag line message 334. In an exemplary embodiment, the tag line message 334 and all subsequent messages are sent using standard 8-bit ASCII characters. In the illustrated embodiment, the tag line message 334 is in the following format:

PROTOCOLNAME VER:N.N [COMMENTS].

where PROTOCOLNAME is the name of the protocol, N.N is the current version of that protocol, and COMMENTS is an optional field which can be used to describe the manufacturer, the date of manufacture, or the like. Thus, in the example shown in FIG. 3, the HATP server 230 transmits the following tag line message:

HATP VER: 1.0 Conv. Corp. 1998.

The HATP server 220 will next send the user command 336 to the HATP server 230. In this case, the USER command 336 includes the parameter "BOB" because this is the user name that client 210 sent as the user ID parameter of its connect command 314. HATP server 230 will check its database of registered user ID's to ensure that "BOB" is a registered user identification. In this example, "BOB" is a registered user identification, so the HATP server 230 responds to HATP server 220 by issuing the OK response 338. The HATP server 220 will then send the password command (PWD) 340 to the HATP server 230. The parameter following the password command 340 is the password which the SDTP client sent as a parameter with its connect command 314 to the HATP server 220. The HATP server 230 will check this password against that stored within its internal database as the appropriate password for BOB and, if this password is correct, will respond with OK 342. The HATP server 220 upon receiving the OK 342 response from the HATP server 230 will then initiate an OK response 344 to the client 210. This OK response allows the client 210 to verify the connection was made between the two HATP servers 220 and 230.

From this time until a DISCONNECT command is sent from the client 210 to its local HATP server 220, all remote SDTP devices which have an established link layer with the remote HATP server (a) will appear to the local SDTP device to be located locally and (b) will respond to any service requests initiated from the local SDTP device. In the exemplary embodiment of FIG. 2 and FIG. 3, a security system 240 is remotely located at the site of the remote HATP server 230. At some earlier point in time, the security system 240 established a link 316 with the HATP server 230 and sent a message "SDTP Ver:1.0 Conv. Corp. 1998" 318 to the HATP server 230. The HATP server 230 issued a TYPE command 320 to the security system 240. The security system 240 responded with its ID and, services 322–330. In this example, the response consisted of the following services STAT 324, ON 326, and OFF 328. While this example, for illustration, shows only a single SDTP device, multiple SDTP devices could have established links with the HATP server 230.

While not required for the local client to access services from the remote server or servers, a local client will usually initiate a TYPE command 346 to interrogate the services available to the local client through the remote HATP server 230. When the local HATP server 220 receives the SDTP TYPE command 346, it sends the HATP TYPE command 348 to the remote HATP server. The remote HATP server 230 will respond with its own ID and associated services 350, 354, 358, as well as all ID's and services 230, 362, 366, 370, 374 and, 378 for SDTP devices in communication over the link layer 316 with the remote HATP server. As the local HATP server 220 receives these responses to the HATP TYPE command 348 from the remote HATP server 230, the local HATP server 220 passes these responses on to the client 210 by transmission of the various commands 352, 356, 360, 364, 368, 372, 376, and 380.

At this point, the local client device 210, in the illustrated embodiment a two-way pager, may seek to access services from the remote server device 230. For example, the local client device 210 may issue the STAT command 382 to seek the status of the alarm system at the office. The local HATP server 230 will relay this command to the remote HATP server 230 by issuing the STAT command 384 which will in turn relay this service to the remote server 240 by issuing the STAT command 386. The remote server device, security system, will determine its status, in this case ARMED, and send this information back to the remote HATP server 220 by replying with the response ARMED 388. The remote HATP server 230 will forward the armed response 390 to the local HATP server 220 which will in turn respond to the local client 210 with the ARMED response 392. Through the mechanism described above, a local client device can access services from a remote server device.

Figure 4:
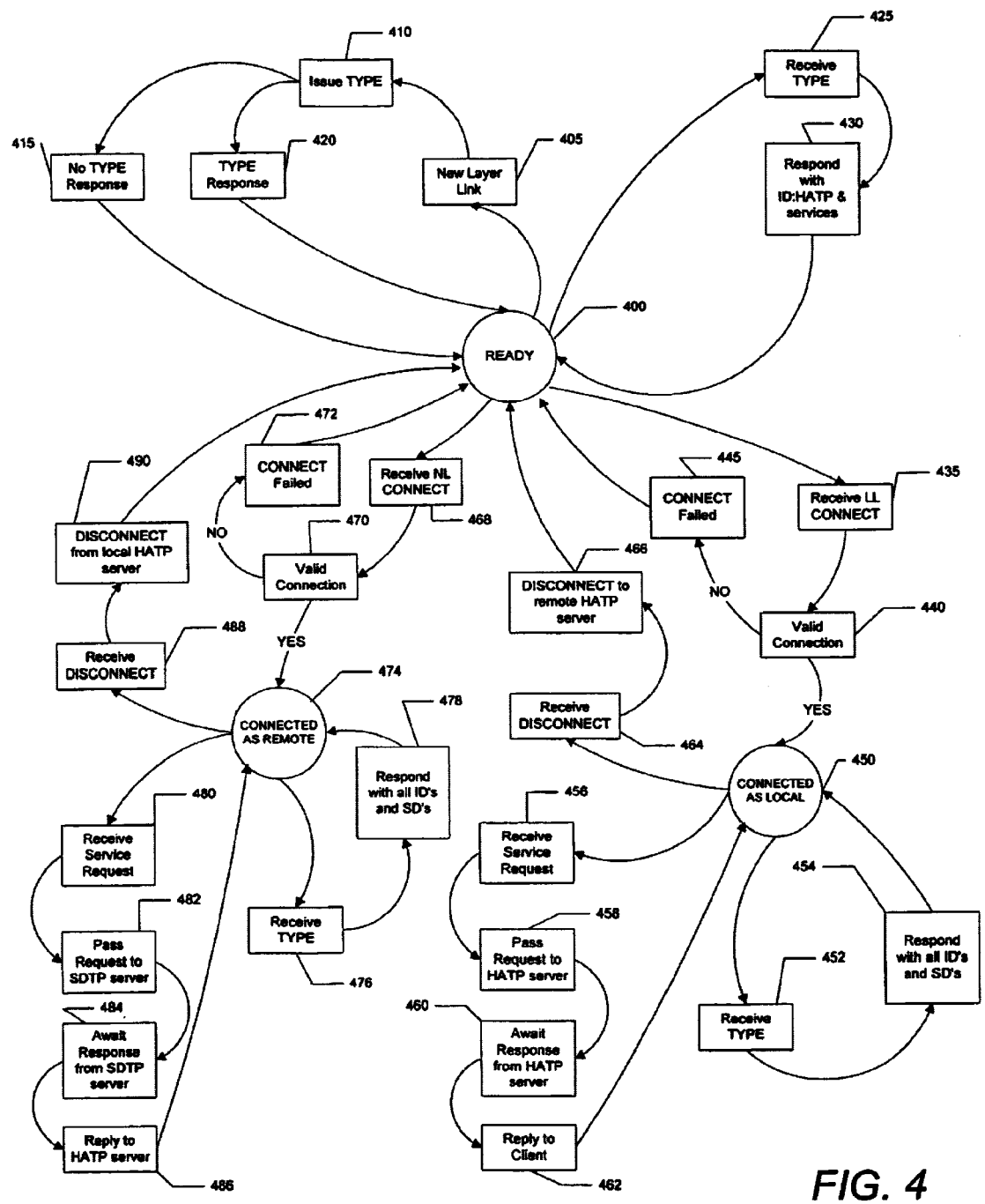
FIG. 4 is an exemplary state diagram showing the basic operation of an exemplary embodiment of the present invention.

FIG. 4 is a useful state diagram of the operation of a typical HATP server running the HATP extended SDTP protocol and the HATP protocol. Upon powerup, the HATP server enters a READY state 400. From this READY state 400, several events may trigger action by the HATP server. If an SDTP device establishes a link layer with the HATP server and a new link is established 405, the HATP server will issue the TYPE command 410 to inventory the services available from the SDTP devices linked to the HATP server. If the SDTP devices are server or client/server devices, they will respond to the TYPE command 410 with a TYPE response 420 consisting of their ID's and SD's (available services). The HATP server will store this inventory of available services in a database for future reference and return to the READY state 400. If the new SDTP devices are only client devices, there will be no response 415 from the new client devices, and the HATP server will return to its READY state 400.

Also from READY state 400, the HATP server may receive a TYPE command 425 from any SDTP devices that have established a link layer with the HATP server. The HATP server would then respond 430 with its own ID of HATP and a listing of its available services: CONNECT & DISCONNECT.

From READY state 400, the HATP server may receive a link layer CONNECT request 435 from an SDTP device. The HATP server will verify 440 that the user identification and password are valid for the remote HATP server with which the SDTP device requests the connection to be made. If the user identification/password combination is not valid or if a connection with another remote HATP server has already been established, the connection will fail 445 and the HATP server will return to its READY state 400. If the user identification/password combination is valid and there is not a connection already established, the HATP server will change to its CONNECTED AS LOCAL state 450.

From the CONNECTED AS LOCAL state 450, the HATP server acts as a local gateway through a remote HATP server to remote SDTP servers. If the HATP server receives a TYPE command 452 from the local SDTP device, the HATP server will query the remote HATP server for a listing of ID's and SD's available from remote SDTP devices. It will then respond 454 with this listing to the local SDTP device that issued the query and return to the CONNECTED AS LOCAL 450 state.

From the CONNECTED AS LOCAL state 450, the HATP server may receive a service request 456 from the local SDTP device to access a service found at a remote SDTP device. The HATP server will pass this service request 458 to the remote HATP server, and await response 460. After the response is received at the local HATP server, the local HATP server will reply to the client 462 by relaying the response received from the remote HATP server and then return to the CONNECT 450 state.

The HATP server may also receive a DISCONNECT command 464 from the local SDTP-device after which it will disconnect 466 from the remote HATP server and return to READY state 400.

From READY state 400, the HATP server may receive a network layer CONNECT request 468 from another HATP server. The HATP server will verify 470 that the user identification and password is valid. If the user identification/password combination is not valid or if a connection with another HATP server has already been established, the connection will fail 472 and the HATP server will return to its READY state 400. If the user identification password combination is valid and there is not a connection already established, the HATP server will change to its CONNECTED AS REMOTE state 474.

From CONNECTED AS REMOTE state 474, the HATP server acts as a remote gateway from which a local HATP server will access remote SDTP servers. If the HATP server receives a TYPE command 476 from the local HATP server, it will then respond 478 to the local HATP server that issued the query with a listing of ID's and SD's available from remote server devices and return to the CONNECTED AS REMOTE 474 state.

From CONNECTED AS REMOTE state 474, the HATP server may receive a service request 480 from the local HATP server to access a service found at a remote SDTP device. The HATP server will pass this service request 482 to the remote SDTP server, and await response 484. After the response is received at the HATP server, the remote HATP server will reply to the local HATP server 486 by relaying the response received from the remote SDTP server.

The HATP server may also receive a DISCONNECT command 488 from the local HATP server after which it will disconnect 490 from the local HATP server and return to READY state 400.

From the foregoing description, it will be appreciated that the present invention provides a system, a protocol and a method for facilitating communication between various remotely located, consumer devices and enabling the consumer devices to share features, functionality and information. Although the present invention has been described using various examples and command formats, it will be appreciated that the present invention is not limited by these examples.

The present invention may be implemented and embodied in a variety of devices and may be implemented in software or hardware. In addition, the operation, steps and procedures of the present invention may be implemented in a variety of programming languages. The specification and the drawings provide an ample description of the operation, steps and procedures of the present invention to enable one of ordinary skill in the art to implement the various aspects of the present invention.

The present invention has been described in detail with particular reference to exemplary embodiments. It is understood that variations and modifications can be effected within the spirit and scope of the invention, as described herein before, and as defined in the appended claims. The corresponding structures, materials, acts, and equivalents of all means or step plus function elements in the claims below are intended to include any structure, material, or acts for performing the functions in combination with other claimed elements as specifically claimed.

What is claimed is:

1. A method for enabling a first consumer device to access services of a remote second device, comprising the steps of:

enabling establishment of a link between the first consumer device and the remote second device via multiple intermediate servers, the first consumer device and the remote second device each configured to have communication capabilities allowing communications only with local devices, by establishing a first communicative connection between the first consumer device and a first intermediate server that is local to the first consumer device; and establishing a second communicative connection between the first intermediate server and a second intermediate server that is remote from the first server and that is local to the second device; and establishing a third communicative connection between the second intermediate server and the second device;

and wherein the link includes the first, second and third communicative connections, and wherein communications from the first consumer device to the remote second device are forwarded along the link by the first and second intermediate servers in a manner transparent to the first consumer device;

under control of the first consumer device, requesting from the first intermediate server a listing of services available via the first intermediate server;

receiving from the first intermediate server a listing of multiple available services; and after receiving the listing of multiple available services, requesting from the first intermediate server one of the multiple available services, the requested service available to be provided by the remote second device; and after the first intermediate server forwards an indication of the requested service to the remote second device via the established link, performing the requested service at the remote second device.

2. The method of claim 1 wherein the step of establishing the second communicative connection further comprises the step of verifying that the first device has authorization to establish the second communicative connection.

3. The method of claim 1 further comprising, after the performing step, the step of sending from the second device to the first device the status of the performing step.

4. The method of claim 1 wherein the listing of multiple available services received by the first consumer device from the first intermediate server are services available from the second device.

5. The method of claim 1 wherein the establishing of the first communicative connection comprises the step of establishing a wireless communicative connection between the first consumer device and the first server.

6. The method of claim 1 wherein the establishing of the third communicative connection comprises the step of establishing a wireless communicative connection between the second device and the second server.

7. The method of claim 1 wherein the communication capabilities of each of the first consumer device and the remote second device use Bluetooth communications.

8. The method of claim 1 wherein the communication capabilities of each of the first consumer device and the remote second device use IrDA communications.

9. An apparatus for accessing services of a remote device via one or more intermediate servers, comprising:

a first module capable of initiating establishment of a first communicative connection to a local intermediate server and of initiating establishment of at least a second communicative connection between the local intermediate server and the remote device, the apparatus configured to have communication capabilities allowing communications only with local devices; and a second module capable of receiving from the local intermediate server a listing of multiple services available via the local intermediate server and of requesting from the local intermediate server one of the multiple available services, the requested service available to be performed from the remote device, so that the remote device will perform the requested service after receiving notification of the request via the first and second communicative connections.

10. A server device that Is capable of communicating over a first communications link with a local client device and over a second network link with a second server device, comprising:
- a communications link interface for communicating between the server device and the local client device, the client device configured to have communication capabilities allowing communications only with local devices;
- a network interface for communicating between the server device and a second server device; and
- a processing unit, being operable to send and receive data over the communications link interface and over the network interface, the processing unit being further operable to:
  - establish a communications link for data communication through the link interface with the client device;
  - establish a network link for data communication through the network interface to the second server device;
  - provide information to the client device about available services by;
    - obtaining information from the second server device about services available via the second server device; and
    - sending to the client device information about available services that includes the obtained information from the second server device; and
  - facilitate performance of services for the client device by,
    - forwarding service requests from the client device to the second server device for one or more of the available services whose information was obtained from the second server device and sent to the client device; and
    - forwarding responses to at least some of the service requests from the second server device to the client device.

11. The server device of claim 10 wherein the communications link is a wireless interface.

12. The server device of claim 10 wherein the forwarding of the service request responses to the client device is performed in such a manner as to appear to the client device that the server device performed the requested services.

13. The server device of claim 10 wherein the Information sent to the client device includes information about services available from the server device, and wherein the processing unit is further operable to perform service requests received from the client device for one or more of the services available from the server device and generate responses to the client device for at least some of those service requests.

14. The server device of claim 10 wherein the second server device is remote from the server device, wherein the second server device is in communication with a third server device that provides the available services whose information was obtained from the second server device, and wherein the service requests forwarded to the second server device for the available services cause the requested available services to be provided by the third server device.

15. The server device of claim 10 wherein the client device is able to perform services for other devices, and wherein the processing unit is further operable to:
- obtain information from the client device about the services that the client device is able to perform;
- send to the second server device the obtained information from the client device; and
- facilitate performance of services for the second server device by the client device by forwarding service requests received from the second server device to the client device.

16. A method for a first client device to access remote, services, comprising the steps of:
- enabling the first client device to access services supplied by a remote second client device via multiple intermediate servers, the first client device and the remote second client device each configured to have communication capabilities allowing communications only with local devices, by
  - establishing a first link between the first client device and a local first server;
  - transmitting a connection command over the first link to the first server, the connection command being operative to request a connection with a second server and comprises an address of the second server, a user identification, and a password;
  - establishing a second link between the first server and a second server;
  - transmitting the connection command over the second link from the first server to the second server;
  - verifying the authorization of the user identification and password at the second server;
  - notifying the first server over the second link from the second server of the acceptance of the connection command upon success of the verifying step;
  - notifying the first client device from the first server over the first link of the acceptance of the connection command;
  - requesting a listing from the first server of available services from the second client device wherein the first server requests such a listing from the second server, the second server maintaining such a listing from the second client device which is local to and communicatively coupled to the second server over a third link, and the listing identifying at least one service offered by the second client device;
  - the first client device requesting a service from the listing to be performed by the second client device by relaying a service request to the second client device; and
  - performing the service requested in the service request by the second client device.

17. The method of claim 16 wherein the communication capabilities of each of the first client device and the second client device use Bluetooth communications.

18. The method of claim 16 wherein the communication capabilities of each of the first client device and the second client device use IrDA communications.

19. A first client apparatus for accessing services supplied by a remote second apparatus, comprising:
- means for initiating establishment of a first link between the first client apparatus and a local first server, the first client apparatus configured to have communication capabilities allowing communications only with local devices;
- means for transmitting a connection command over the first link to the local first server, the connection command being operative to request a connection with a remote second server that is local to the remote second apparatus and comprising a user identification, and a password;
- means for receiving notification from the local first server over the first link of acceptance of the connection command by the remote second server, the receiving of the acceptance notification after a second link is established between the local first server and the remote second server and after the remote second server verifies authorization of the user identification and password;

means for requesting a listing from the local first server of one or more services available from the remote second apparatus based at least in part on a listing maintained by the remote second server that includes information obtained from the remote second apparatus over a third link communicatively coupling the remote second server to the remote second apparatus, the remote second apparatus configured to have communication capabilities allowing communications only with local devices;

means for receiving from the local first server the requested listing after the local first server obtains that listing from the remote second server; and means for requesting a service from the listing to be performed by the remote second apparatus by relaying a service request to the remote second apparatus via the local first server, such that the requested service will be performed by the remote second apparatus.

20. A system for allowing client devices remote from each other to communicate via intermediate server devices, the system comprising:

a local server able to communicatively couple to a client device that is local to the local server, the local client device designed to communicate only with other local client devices, the local server also able to communicatively couple to a remote server, the local server operative to:

receive a request from the local client device for an indicated service to be performed;

provide a request message to the remote server to perform the indicated service;

receive a response message from the remote server, the response message being affiliated with the request message; and respond to the local client device with information indicative of the response message; and the remote server able to communicatively couple to the local server and to a remote client device that is local to the remote server, the remote server operative to:

receive the request message from the local server;

perform further processing based on the request message; and provide the response message to the local server;

so that the local client device can request services that are provided by the remote client device by using the local and remote servers as intermediaries.

21. The system of claim 20, wherein the request from the local device comprises a request to establish a logical connection to the remote server and includes an IP network address of the remote server.

22. The system of claim 20, wherein the request from the local device comprises a request to establish a logical connection between the local device and the remote server.

23. The system of claim 22, wherein the request from the local device further includes a user identification and a password, and the providing of the request message to the remote server and the receiving of the response message from the remote server includes:

establishing a link with the remote server;

transmitting the user identification to the remote server;

receiving a first status indicator from the remote server in response to, the user identification;

transmitting the password to the remote server; and receiving a second status indicator from the remote server in response to the password.

24. The system of claim 23, wherein after establishing a link with the remote server, the local server receives a message from the remote server indicating that the remote server is communicatively compatible with the local device.

25. The system of claim 23, wherein the first status indicator indicates that the user identification is not accepted by the remote server.

26. The system of claim 23, wherein the first status indicator indicates that the user identification is accepted by the remote server.

27. The system of claim 23 wherein the second status indicator indicates that the password provided is valid for the user identification.

28. The system of claim 23, wherein the second status indicator indicates that the password provided is Invalid for the user identification.

29. The system of claim 23, wherein the responding to the local device with information indicative of the response message includes:

providing a first response if the response message indicates that the logical connection could not be established;

providing a second response if the response message indicates that the user identification and password are not both acceptable by the remote server;

providing a third response if the response message indicates that the logical connection is established; and providing a fourth response if the response message indicates that a logical connection already exists with another server.

30. The system of claim 20, wherein the request message from the local device comprises a request to disconnect a logical connection to the remote server.

31. The system of claim 20, wherein the request from the local device comprises a request to disconnect a logical connection between the local device and the remote server, wherein the providing of the request message to the remote server includes transmitting to the remote server a request to disconnect the logical connection between the local device and the remote server, and wherein the receiving of the response message from the remote server includes receiving a status indicator from the remote server indicating that the logical connection is disconnected.

32. The system of claim 20, wherein the request from the local device comprises a request for the remote device to provide a service.

33. The system of claim 20, wherein the request from the local device comprises a request for the remote server to identify a device type and a service type for at least one remote device that can be communicatively coupled to the remote server.

34. The system of claim 20, wherein the request from the local device comprises a request for the remote device to provide a service, and wherein the performing of the further processing includes requesting the remote device to perform the service identified in the service request and the request message.

35. A method for a first consumer device to access services of a remote second device, comprising:

establishing a link between the first consumer device and the remote second device that allows the first consumer device to access services from the remote second device, the first consumer device and the remote second device each configured to have communication capabilities allowing communications only with local devices, by
  establishing a first communicative connection between the first consumer device and a first server that is local to the first consumer device;
  establishing a second communicative connection between the first server and a second server that is remote from the first server and local to the second device; and
  establishing a third communicative connection between the second server and the second device;
  wherein the established link includes the first, second and third communicative connections and wherein communications from the first consumer device to the remote second device are forwarded along the link by the first and second servers in a manner transparent to the first consumer device, the forwarding in the transparent manner such that the first consumer device and the second device appear to each other to be local;
requesting a service that is available from the second device, the requesting by the first consumer device and utilizing the established link; and performing the requested service at the second device.

36. The method of claim 35 wherein the communication capabilities of each of the first consumer device and the remote second device use Bluetooth communication.

37. The method of claim 35 wherein the communication capabilities of each of the first consumer device and the remote second device use IrDA communication.

38. A method for a first consumer device to access services of a remote second device, comprising:
  establishing a link between the first consumer device and the remote second device that allows the first consumer device to access services from the remote second device, the first consumer device and the remote second device each able to communicate only with local devices, by
    establishing a first communicative connection between the first consumer device and a first server that Is local to the first consumer device;
    establishing a second communicative connection between the first server and a second server that is remote from the first server and local to the second device; and
    establishing a third communicative connection between the second server and the second device;
    wherein the established link includes the first, second and third communicative connections and wherein communications from the first consumer device to the remote second device are forwarded along the link by the first and second servers in a manner transparent to the first consumer device, the forwarding in the transparent manner including the first server device representing the second device in communications with the first consumer device over the first communicative connection and including the second server device representing the first device in communications with the second device over the second communicative connection;
  requesting a service that is available from the second device, the requesting by the first consumer device and utilizing the established link; and
  performing the requested service at the second device.

39. The method of claim 38 wherein the communication capabilities of each of the first consumer device and the remote second device use Bluetooth communications.

40. The method of claim 38 wherein the communication capabilities of each of the first consumer device and the remote second device use IrDA communications.

41. A server device that is capable of communicating over a first communications link with a client device and over a second network link with a second server device, comprising:
  a communications link interface for communicating between the server device and the client device using SDTP protocol:
  a network interface for communicating between the server device and a second server device using HATP protocol; and
  a processing unit, being operable to send and receive data over the communications link interface and over the network interface, the processing unit being further operable to:
    establish a communications link for data communication through the link interface with the client device;
    establish a network link for data communication through the network interface to the second server device;
    provide information to the client device about available services by,
      obtaining information from the second server device about services available via the second server device; and
      sending to the client device information about available services that includes the obtained information from the second server device; and
    facilitate performance of services for the client device by,
      forwarding service requests from the client device to the second server device for one or more of the available services whose information was obtained from the second server device and sent to the client device; and
      forwarding responses to at least some of the service requests from the second server device to the client device.

42. The server device of claim 41 wherein the communications link between the client device and the server device includes a wireless interface.

43. The server device of claim 41 wherein the communications link between the client device and the server device uses Bluetooth communications.

44. The server device of claim 41 wherein the communications link between the client device and the server device uses IrDA communications.

45. A method for a first consumer device to access services of a remote second device, comprising the steps of:
  establishing a link between the first consumer device and the remote second device via multiple intermediate servers that allows the first consumer device to access services from the remote second device, by
    initiating establishment of a first communicative connection between the first consumer device and a first server that is local to the first consumer device, the first communicative connection using SDTP protocol for communications over the connection; and
    initiating establishment of a second communicative connection between the first server and a second server that is remote from the first server and local to the second device, the second communicative connection using HATP protocol for communications over the connection, so that the second server and the second device can communicate using a third communicative connection, wherein the established link includes the first, second and third communicative connections; and requesting a service that is available from the second device, the requesting by the first consumer device and utilizing the established link, such that the second device performs the requested service after receiving the request.

46. The method of claim 45 wherein the first communicative connection and the third communicative connection each use Bluetooth or IrDA communications.

47. The method of claim 45 wherein the establishing of the second communicative connection includes verifying that the first consumer device has authorization to establish the second communicative connection.

48. The method of claim 45 further comprising, after the second device performs the requested service, receiving by the first consumer device of status information regarding the performing from the second device.

49. The method of claim 45 including, before the requesting of the service and under control of the first consumer device, requesting from the first server a listing of services available via the first server, and receiving in response a listing of multiple available services that include the services available from the second device.

50. The method of claim 45 wherein the first communicative connection between the first consumer device and the first server is a wireless connection.

51. The method of claim 45 wherein the third communicative connection between the second device and the second server is a wireless connection.

52. An apparatus for accessing services of a remote device, comprising:
   a first module capable of initiating establishment of a first communicative connection to a local server such that the first connection uses SDTP protocol, of initiating establishment of a second communicative connection between the local server and a remote server proximate to the remote device such that the second connection uses HATP protocol, and of initiating establishment of a third communicative connection between the remote server and the remote device such that the third connection uses SDTP protocol; and
   a second module capable of requesting a service from the remote device via the first, second, and third communicative connections;
so that the remote device will perform the requested service.

53. The apparatus of claim 52 wherein a module of the apparatus is further capable of transmitting user identification and password via the local server to the remote server.

54. The apparatus of claim 52 wherein the second module is further capable of receiving from the second device status information regarding performance of the requested service.

55. The apparatus of claim 52 wherein the second module is further capable of requesting and receiving a listing of services available from the second device.

56. The apparatus of claim 52 wherein the first and third communicative connections are each wireless connections.

57. The apparatus of claim 52 wherein the first and third communicative connections are each based on Bluetooth and/or IrDA.

58. A method for a first client device to access the services supplied by a second client device, comprising the steps of:
   establishing a first link between the first client device and a first server, wherein communications over the first link use SDTP protocol;
   transmitting a connection command over the first link to the first server, the connection command being operative to request a connection with a second server and including an address of the second server, a user identification, and a password;
   establishing a second link between the first server and a second server based on the connection command, wherein communications over the second link use HATP protocol;
   transmitting the connection command over the second link from the first server to the second server;
   verifying the authorization of the user identification and password at the second server;
   notifying the first server over the second link from the second server of the acceptance of the connection command upon success of the verifying step;
   notifying the first client device from the first server over the first link of the acceptance of the connection command;
   requesting a listing from the first server of available services from the second client device wherein the first server requests such a listing from the second server, the second server maintaining such a listing from the second client device which is communicatively coupled to the second server over a third link, the listing identifying at least one service offered by the second client device;
   the first consumer device requesting a service from the listing to be performed by the second client device by relaying a service request to the second client device via the first, second and third links; and
   performing the service requested in the service request by the second client device.

59. The method of claim 58 including, after the establishing of the second link, receiving a message from the second server indicating that the second server is communicatively compatible with the first client device.

60. The method of claim 58 including, when the verifying of the authorization of the user identification fails, receiving an indication at the first client device that the user identification is not accepted.

61. The method of claim 58 including, when the verifying of the authorization of the password fails, receiving an indication at the first client device that the password is not accepted.

62. The method of claim 58 wherein the request from the first consumer device comprises a request to identify a device type and a service type for the second client device.

63. A first client apparatus for accessing services supplied by a second apparatus, comprising:
   means for initiating establishment of a first link between the first apparatus and a first server, the first link using SDTP protocol for communications over the first link;
   means for transmitting a connection command over the first link to the first server, the connection command being operative to request a connection with a remote second server and including a user identification, and a password;
   means for receiving notification from the first server over the first link of acceptance of the connection command by the second server, the receiving of the acceptance notification after a second link is established between the first server and the second server, after the connection command is transmitted over the second link from the first server to the second server, and after the second server verifies authorization of the user identification and password, the second link using HATP protocol for communications over the second link;

means for requesting a listing from the first server of one or more services available from the second apparatus, wherein the second server maintains such a listing based on information obtained from the second apparatus over a third link communicatively coupling the second server to the second apparatus, the third link using SDTP protocol for communications over the third link, and wherein the first server obtains the listing from the second server;

means for receiving from the first server the requested listing; and means for requesting a service from the listing to be performed by the second apparatus by relaying a service request to the second apparatus via the first server, such that the requested service will be performed by the second apparatus.

64. The apparatus of claim 63 further comprising means for receiving from the second apparatus a status indication for performance of the service request.

65. The apparatus of claim 63 wherein the first link is a wireless connection.

66. The apparatus of claim 63 wherein the third link is a wireless connection.

67. A system for allowing client devices remote from each other to communicate via intermediate server devices, the system comprising:

a local server able to communicatively couple to a client device that Is local to the local server using SDTP protocol, the local client device designed to communicate only with other local client devices, the local server also able to communicatively couple to a remote server using HATP protocol, the local server operative to:
receive a request from the local client device for an indicated service to be performed;
provide a request message to the remote server to perform the indicated service;
receive a response message from the remote server, the response message being affiliated with the request message; and
respond to the local client device with information indicative of the response message; and the remote server able to communicatively couple to the local server using the HATP protocol and to a remote client device that is local to the remote server using the SDTP protocol, the remote server operative to:
receive the request message from the local server;
perform further processing based on the request message; and
provide the response message to the local server;

so that the local client device can request services that are provided by the remote client device by using the local and remote servers as intermediaries.

68. The system of claim 67 wherein the communicative coupling to the remote server is performed in response to a request from the local client device that includes a user identification and a password, and includes:
establishing a link with the remote server;
transmitting the user identification to the remote server;
receiving a first status indicator from the remote server in response to the user identification;
transmitting the password to the remote server; and
receiving a second status indicator from the remote server in response to the password.

69. The system of claim 67, wherein the request from the local device comprises a request to disconnect a logical connection between the local device and the remote server, wherein the providing of the request message to the remote server includes transmitting to the remote server a request to disconnect the logical connection between the local device and the remote server, and wherein the receiving of the response message from the remote server includes receiving a status indicator from the remote server indicating that the logical connection is disconnected.

70. The system of claim 67 wherein the request from the local client device comprises a request for the remote client device to provide a service.

71. The system of claim 67 wherein the request from the local client device comprises a request for the remote server to identify a device type and a service type for at least one remote device that can be communicatively coupled to the remote server.

72. The system of claim 67, wherein the request from the local client device comprises a request for the remote client device to provide a service, and wherein the performing of the further processing includes requesting the remote client device to perform that service.

* * * * *

UNITED STATES PATENT AND TRADEMARK OFFICE
CERTIFICATE OF CORRECTION

PATENT NO. : 6,941,374 B1
DATED : September 6, 2005
INVENTOR(S) : Jason A. Kronz It is certified that error appears in the above-identified patent and that said Letters Patent is hereby corrected as shown below:

Title page,
Item [56], References Cited, U.S. PATENT DOCUMENTS, the following should be included:

| | | | |
|---|---|---|---|
| -- 6,038,595 | 03/14/00 | Ortony | 709/218 |
| 6,249,815 | 06/19/01 | Foladare et al. | 709/223 |
| 6,678,737 | 01/13/04 | Bucher | 709/231 |
| 6,032,151 | 02/29/00 | Arnold et al. | 707/103 |
| 6,185,611 | 02/06/01 | Waldo et al. | 709/221 |
| 6,393,497 | 05/21/02 | Arnold et al. | 709/330 |
| 6,430,599 | 08/06/02 | Baker et al. | 709/203 |
| 6,446,070 | 09/03/02 | Arnold et al. | 707/10 |
| 6,560,656 | 05/06/03 | O'Sullivan et al. | 709/250 |
| 6,772,420 | 08/03/04 | Poger et al. | 719/327 --. |

OTHER PUBLICATIONS, the following should be included:

-- Cisco Systems Inc., "Configuring CDP," March 30, 1999, retrieved November 9, 2004 from http://www.cisco.com/univercd/cc/td/doc/product/lan/cat5000/rel_4_5/config/cdp.htm, 4 pages.

Javvin Company, "CDP: Cisco Discovery Protocol," retrieved November 9, 2004 from http://www.javvin.com/protocolCDP.html, 3 pages.

Hiemstra, J., "CCNA 640-821 INTRO Technotes: CDP," retrieved November 9, 2004 from http://www.techexams.net/technotes/ccna/intro/cdp.shtml, 3 pages.

Sun Microsystems, Inc., "JXTA™ Technology: Creating Connected Communities," January 2004, retrieved November 8, 2004 from http://www.jxta.org/project/www/docs/JXTA-Exec-Brief.pdf, 6 pages.

GigaSpaces Technologies, Ltd., "GigaSpaces Platform – White Paper," February 25, 2002, retrieved November 8, 2004 from http://web.archive.org/web/20030607073327/j-spaces.com/download/GigaSpacesWhitePaper.pdf, 14 pages.

"Technical JXTA™ FAQ," retrieved November 8, 2004 from http://www.jxta.org/JXTAFAQTech.html, 10 pages.

"General JXTA™ FAQ," retrieved November 8, 2004 from http://www.jxta.org/JXTAFAQ.html, 12 pages.

UNITED STATES PATENT AND TRADEMARK OFFICE
CERTIFICATE OF CORRECTION

PATENT NO.    : 6,941,374 B1
DATED         : September 6, 2005
INVENTOR(S)   : Jason A. Kronz It is certified that error appears in the above-identified patent and that said Letters Patent is hereby corrected as shown below:

Title page (cont'd),

OpenP2P.com, "Joy Announces JXTA," retrieved November 8, 2004 from http://www.openp2p.com/lpt/a/627, 2 pages.

Phrack Inc., "Chapter Four of The Future Transcedent Saga – Beyond Bitnet Lies Infinity," vol. 2, no. 24, file 4 of 13, February 12, 1989, retrieved November 8, 2004 from http://www.phrack.org/show.php?p=24&a=4, 9 pages.

Venners, B., "Objects, the Network, and Jini," *Javaworld*, June 1999, retrieved November 8, 2004 from http://www.artima.com/jini/jiniology/introP.html, 7 pages.

Artima Software, Inc., "FAQ for JINI-USERS Mailing List," retrieved November 8, 2004 from http://www.artima.com/jini/faq.html, 20 pages.

Chen, K., et al., *Programming Open Service Gateways with Java Embedded Server™ Technology*, Addison Wesley Professional, August 30, 2001, Chapter 1, "Introduction," pp. 1-14, retrieved January 26, 2005, from http://www.awprofessional.com/content/images/0201711028/samplechapter%5Cchench01.pdf, 15 pages OSGi™ Alliance, "About the OSGi Alliance," retrieved January 26, 2005, from http://www.osgi.org/about/index.asp?section=1, 2 pages.

Niccolai, J., "Microsoft Fires Back at Sun's Jini," January 8, 1999, retrieved January 26, 2005, from http://www.javaworld.com/javaworld/jw-01-1999/jw-01-idgns-msplugplay_p.html, 2 pages.

"Pnp Middleware Connects Home Appliances for Networking," Nikkei Electronics Asia: August 1999 – Special Report, retrieved January 26, 2005, from http://www.nikkeibp.com/nea/aug99/specrep/, 7 pages.

Home Toys Inc., "Echelon Corporation Takes Leadership Role in Microsoft's Universal Plug and Play Forum," November 2, 1999, retrieved January 26, 2005, from http://www.hometoys.com/releases/nov99/echelon02.htm, 2 pages.

Elliotte Rusty Harold, "August 1998 Java News," August 31, 1998, retrieved January 26, 2005, from http://www.ibiblio.org/javafaq/1998august.html, 10 pages.

Microsoft Corporation, "Microsoft® Windows® Me Millennium Edition – Understanding Universal Plug and Play," June 2000, retrieved January 26, 2005, from http://www.upnp.org/download/UPNP_UnderstandingUPNP.doc, 45 pages.

Sun Microsystems, Inc., "Jini™ Network Technology – An Executive Overview," February 2001, retrieved January 26, 2005, from http://www.sun.com/software/jini/whitepapers/jini-execoverview.pdf, 19 pages.

Sun Microsystems, Inc., "The Connected Home Powered by Java Embedded Server™ Software," December 2000, retrieved January 26, 2005, from http://java.sun.com/products/consumer-embedded/whitepapers/dot.com.home.pdf, 28 pages. --.

UNITED STATES PATENT AND TRADEMARK OFFICE
CERTIFICATE OF CORRECTION

PATENT NO. : 6,941,374 B1
DATED : September 6, 2005
INVENTOR(S) : Jason A. Kronz It is certified that error appears in the above-identified patent and that said Letters Patent is hereby corrected as shown below:

Column 18,
Line 18, "Invalid" should read -- invalid --.

Column 19,
Line 40, "Is" should read -- is --.

Column 23,
Line 29, "Is" should read -- is --.

Signed and Sealed this

Seventh Day of February, 2006

JON W. DUDAS
*Director of the United States Patent and Trademark Office*